(12) United States Patent
Bowers et al.

(10) Patent No.: US 10,215,208 B2
(45) Date of Patent: Feb. 26, 2019

(54) FASTENER FOR SECURING TOGETHER TWO PANELS

(71) Applicants: Ned C. Bowers, Mount Dora, FL (US); Russell Ortner, Apopka, FL (US)

(72) Inventors: Ned C. Bowers, Mount Dora, FL (US); Russell Ortner, Apopka, FL (US)

( * ) Notice: Subject to any disclaimer, the term of this patent is extended or adjusted under 35 U.S.C. 154(b) by 222 days.

(21) Appl. No.: 15/255,230

(22) Filed: Sep. 2, 2016

(65) Prior Publication Data

US 2017/0074304 A1 Mar. 16, 2017

Related U.S. Application Data

(63) Continuation-in-part of application No. 14/850,092, filed on Sep. 10, 2015, now Pat. No. 9,850,928.

(51) Int. Cl.
| | |
|---|---|
| *F16B 5/10* | (2006.01) |
| *E05B 1/00* | (2006.01) |
| *F16B 5/06* | (2006.01) |
| *F16B 3/00* | (2006.01) |
| *F16B 37/06* | (2006.01) |
| *F16B 39/06* | (2006.01) |

(52) U.S. Cl.
CPC ............ *F16B 5/0642* (2013.01); *E05B 1/003* (2013.01); *F16B 5/10* (2013.01); *F16B 3/00* (2013.01); *F16B 37/065* (2013.01); *F16B 39/06* (2013.01); *F16B 2005/0671* (2013.01)

(58) Field of Classification Search
CPC .......... F16B 5/0208; F16B 5/10; F16B 37/16; F16B 41/002; Y10T 16/513; Y10T 16/515; Y10T 16/516; E05B 1/003; E05B 2001/0076; E05B 63/125
USPC ................ 411/409, 999; 292/DIG. 63, 336.3
See application file for complete search history.

(56) References Cited

U.S. PATENT DOCUMENTS

| | | |
|---|---|---|
| 905,294 A | 12/1908 | DeGroff |
| 2,283,526 A | 5/1942 | Albin |
| 2,486,411 A | 11/1949 | Huelster |
| 2,670,021 A | 2/1954 | Torresen et al. |
| 2,798,404 A * | 7/1957 | Schaefer ................ F16B 37/16 16/110.1 |
| 2,878,542 A | 3/1959 | Mills |
| 2,881,499 A | 4/1959 | Summers et al. |
| 2,922,211 A | 1/1960 | Boyd |
| 3,488,815 A | 1/1970 | Metz |
| 3,495,307 A | 2/1970 | Metz |

(Continued)

OTHER PUBLICATIONS

ALCOA, "2600/2700 Series. General Purpose Stud Assemblies", pp. 1 of 1 no date available.

*Primary Examiner* — Flemming Saether
(74) *Attorney, Agent, or Firm* — Robert L. Wolter, Esq.; Beusse Wolter Sanks & Maire, PLLC

(57) ABSTRACT

A fastener is provided for securing a first panel to a second panel. The fastener includes a stud insertable through apertures in the first and second panels. A handle pivotally connected to a stud head and pivotal between an upright position and a folded. A biasing assembly is connected to the stud head and the handle that biases the handle outward relative to the stud head. A fastener is also provided for securing together the first and second panels, including a grommet, a receptacle and an insert in threaded engagement with an interior of the receptacle. The receptacle may be a rivet nut.

16 Claims, 18 Drawing Sheets

(56) References Cited

U.S. PATENT DOCUMENTS

| | | | |
|---|---|---|---|
| 3,675,280 A * | 7/1972 | Winslade | F16B 21/04 |
| | | | 411/552 |
| 4,378,615 A | 4/1983 | Gunther | |
| 5,658,107 A | 8/1997 | Smith | |
| 5,688,093 A | 11/1997 | Bowers | |
| 5,690,460 A | 11/1997 | Attanasio | |
| 5,716,180 A | 2/1998 | Bowers | |
| 5,795,122 A | 8/1998 | Bowers | |
| 7,990,722 B2 * | 8/2011 | Cao | H01L 23/4006 |
| | | | 165/185 |
| 7,997,843 B2 | 8/2011 | Bowers | |
| 8,282,329 B2 | 10/2012 | Bowers et al. | |
| 8,490,358 B2 | 7/2013 | Bowers et al. | |
| 8,745,951 B2 | 6/2014 | Bowers et al. | |
| 8,757,952 B2 | 6/2014 | Bowers et al. | |
| 9,360,037 B2 * | 6/2016 | Wang | F16B 5/0088 |
| 9,850,928 B2 * | 12/2017 | Bowers | F16B 5/0642 |

* cited by examiner

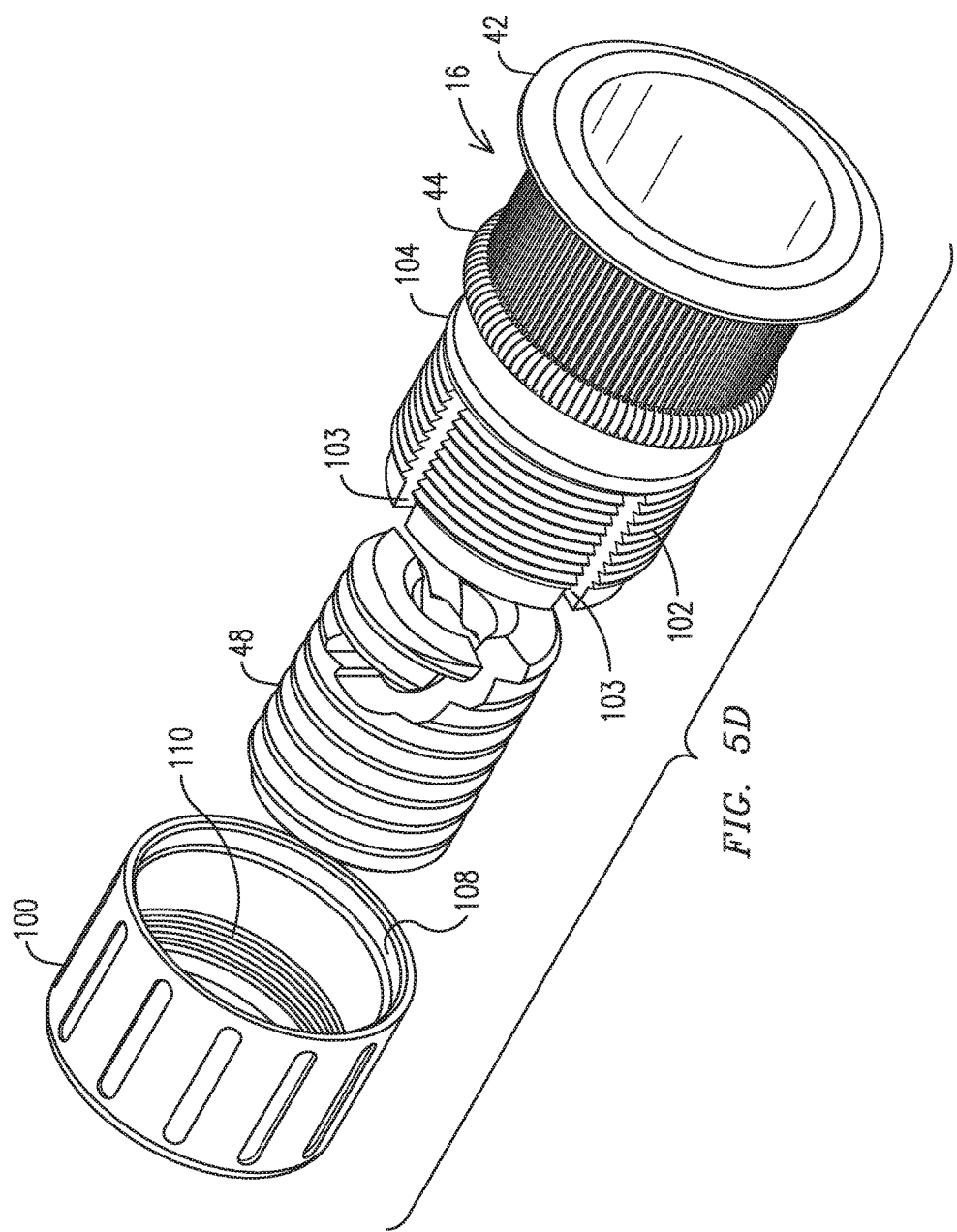

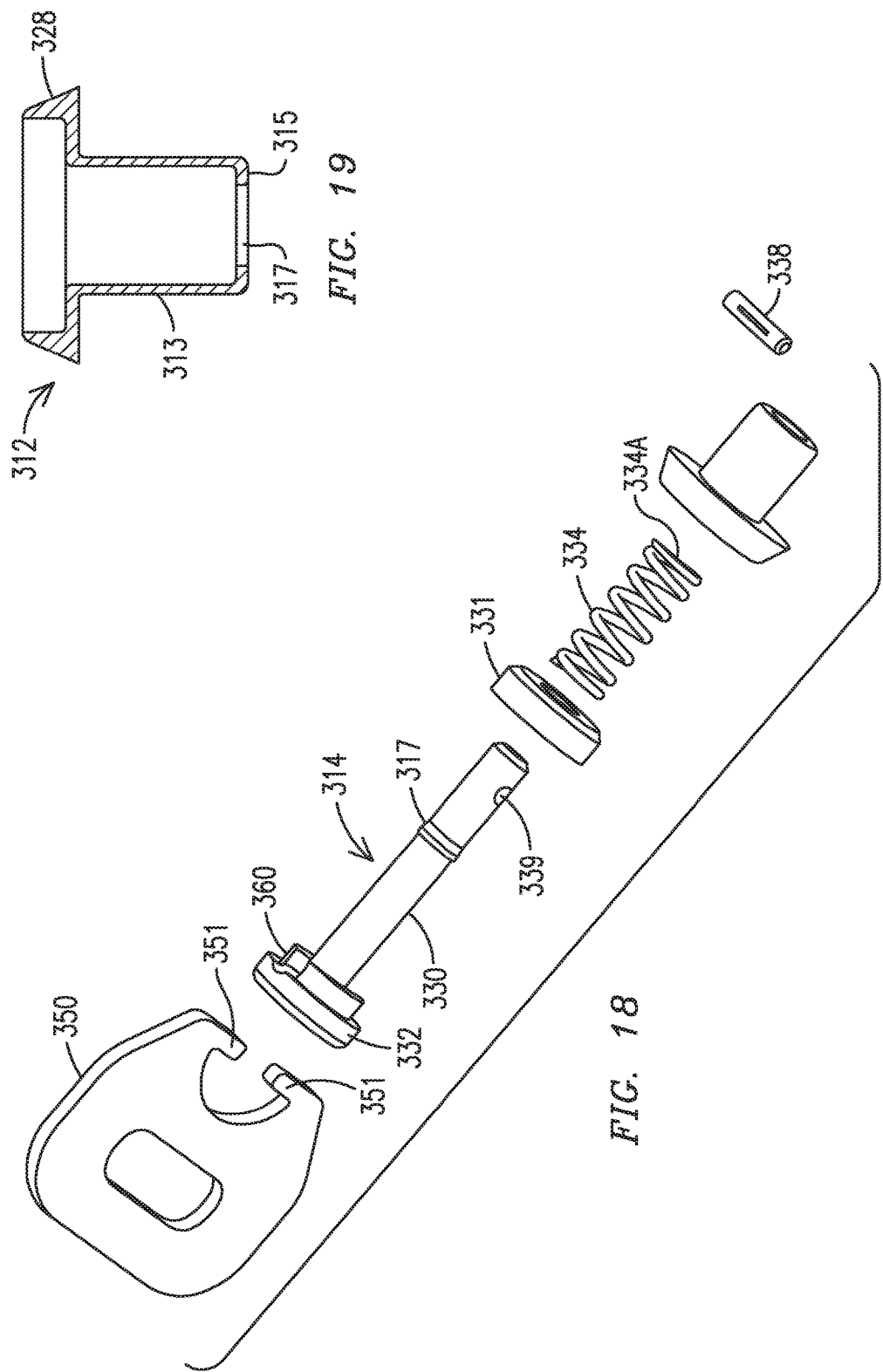

FASTENER FOR SECURING TOGETHER TWO PANELS

CROSS-REFERENCE TO RELATED APPLICATIONS

This application is a Continuation-In-Part of U.S. patent application Ser. No. 14/850,092, filed on Sep. 10, 2015, and is incorporated herein by reference in its entirety.

BACKGROUND OF THE INVENTION

The present invention relates to quick connect fasteners for holding panels, other components, together and, more particularly, to ¼ turn fasteners which can be fastened and unfastened quickly and repeatedly.

As can be seen from Prior Art FIG. 1, fasteners 110 of the ¼ turn type have been known which include a grommet 112, a stud 114 and a receptacle 116. The fastener 110 holds together two panels 118 and 120, with adjacent sides of the panels in contact with one another, by extending through openings 122 and 124 formed in the panels to receive the fastener. The grommet 112 has a cylindrical body 126 sized to extend through the opening 122 in one of the panels 118, usually an outer panel, and one end of the cylindrical body 126 has a radially outward extending flange 128 to engage the outer surface of the outer panel 118. The stud 114 has a shaft 130, a head 132, a cross pin 134 extending through the shaft at an end opposite to the head, a cup member 136 slidable along the shaft and a spring on the shaft between the head and cup member and received in the cup member.

The receptacle 116 of the fastener 110 has a generally cylindrical body 142 and a flange 144 projecting radially outward from one end of the body. The receptacle body 142 defines a central opening and has cam and locking surfaces 146 defined at an end opposite the radially outward extending receptacle flange 144. The panels 118 and 120 are brought together so that the stud 114 and the receptacle 116 are in alignment. The head 132 of the stud 114 is engaged by a turning tool pushed inwardly against the bias of the spring, and turned ¼ turn with the cross pin 134 of the 130 in engagement with the cam and locking surfaces 146 of the receptacle 116. This action locks the fastener 110 in place with the two panels 118 and 120 in secure engagement with one another.

Although the fastener 110 employs a turning tool to turn the stud head 132 and engage the cross pin 134 with the receptacle 116, other such fasteners may include a folding handle pivotally attached to the stud head, to perform this step. In an upright position, the folding handle is used to turn the stud head and can then be pivoted out of the way into a folded position after the stud head is turned. For example, folding rings have been used as such a folding handle in ¼ turn fasteners and include projections which are received within the stud head, to pivotally attach the folding rings to the stud head. However, one drawback of these folding handles is they may become dislodged from the stud head with minimum torsional force while being used to turn the stud head.

Another drawback of such ¼ turn fasteners is that they may require access to the back of the supporting panel 120, in order to secure the flange 144 to the panel 118. However, in many applications one is not able to access certain areas of a panel. Although fastening devices that include fastener receptacles that are referred to as rivet nuts or nutserts are known which do not require access to a back of the supporting panel, these fastener receptacles (rivet nuts or nutserts) are not capable of direct engagement with such ¼ turn fasteners.

BRIEF DESCRIPTION OF THE INVENTION

In one embodiment, a fastener is provided for securing a first panel to a second panel, where the first panel and the second panel each include an aperture for receiving the fastener. The fastener includes a stud insertable through the aperture in the first panel and engageable with the second panel to secure the first panel to the second panel. The stud has one end that is insertable through the apertures and a stud head distal to the end. The fastener further includes a pivoting handle assembly with a handle operatively connected to the stud head. The handle is pivotal between an upright position in which the handle is generally perpendicular to the first panel, and a folded position in which the handle is generally parallel to the first panel. The fastener further includes a biasing mechanism connected to the stud head and the handle that biases the handle outward relative to the stud head. The fastener further includes a locking pin connected to the stud head and the handle and in connection with the biasing mechanism to hold the handle in the upright position or the folded position.

In another embodiment, a fastener is provided for securing a first panel to a second panel, where the first panel and the second panel each include an aperture for receiving the fastener. The fastener includes a stud insertable through the aperture in the first panel and engageable with the second panel to secure the first panel to the second panel. The stud has one end that is insertable through the apertures and a stud head distal to the end. The fastener also includes a pivoting handle assembly that has a handle operatively connected to the stud head. The handle is pivotal between an upright position in which the handle is generally perpendicular to the first panel, and a folded position in which the handle is generally parallel to the first panel. The pivoting handle assembly also includes a biasing mechanism disposed in a central boring of a block of the stud head, and an axle of the handle disposed within a slot of the block, where the axle is disposed perpendicular to the biasing mechanism such that the biasing mechanism biases the axle outward relative to the stud head.

In another embodiment, a fastener is provided for securing together a first panel to a second panel, where the first panel and the second panel each include an aperture for receiving the fastener. A first side of the first panel and the second panel are facing each other, and a second side of each is facing away from each other. The fastener includes a grommet with an opening and a radially outwardly extending flange for engaging the second side of the first panel. The fastener also includes a receptacle that is a rivet nut mounted to the first side of the second panel and with a central opening facing the first side of the first panel and aligned with the respective apertures of the first panel and second panel. The fastener further includes an insert in threaded engagement with an interior surface of the rivet nut receptacle and the insert having cam and locking surfaces for engaging a cross pin of a stud having been inserted through the grommet.

In other aspects, the invention may comprise a fastener for securing a first panel to a second panel, wherein the first panel and the second panel each include an aperture and the apertures are aligned for receiving the fastener. The fastener may comprise a stud including a shaft, a head at a first end of the shaft and distal to a second end of the shaft, wherein the shaft and second end of the shaft are insertable through the apertures in the first and second panels. A handle is pivotally connected to the head of the stud. A spring disposed along the shaft between the head of the stud and the second end of the shaft. A grommet has a flange portion and cylindrical body connected to the flange and cylindrical body surrounds at least a portion of the spring and at least a portion of the shaft. A retainer ring is disposed on the shaft between the head of the stud and the second end of the shaft. A spacer is positioned between the handle and spring, and the spacer is in contact with the handle and spring; and, wherein the spring has a top end in contact with the spacer and a bottom end in contact with the retainer ring when in an unlocked position and in contact with an interior surface of the cylindrical body of the grommet, when in a locked position.

BRIEF DESCRIPTION OF THE DRAWINGS

These and other advantages of the invention will become more apparent from the following description in view of the drawings. Similar structures illustrated in more than one figure are numbered consistently among the drawings.

FIGS. 5A-5D include various views of a receptacle with a fastener insert and a lock cap according to embodiments of the present invention.

FIG. 18 is an exploded view of the fastener of FIGS. 17A and 17B

FIG. 19 is a sectional view of a grommet of the fastener of FIGS. 17A and 17B.

DESCRIPTION OF THE INVENTION

Figure 1:
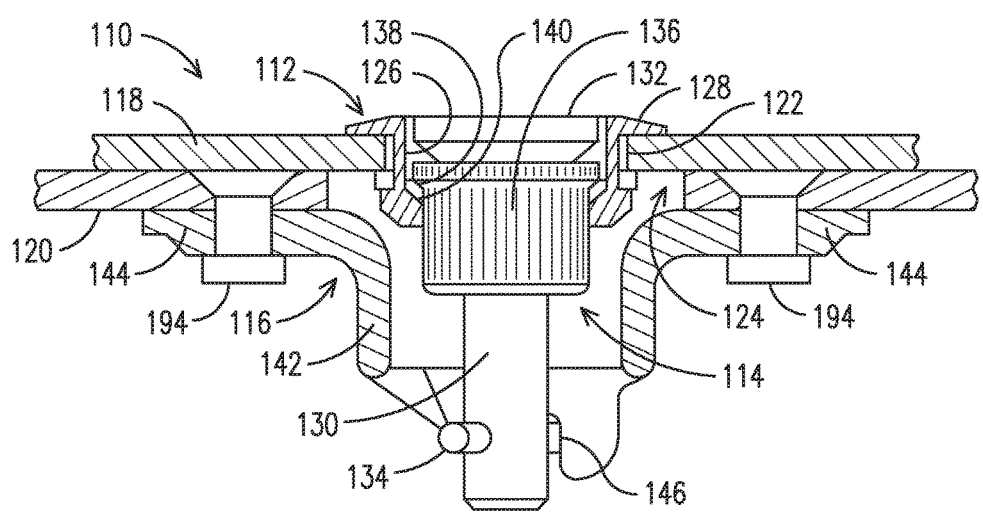
FIG. 1 is a cross section of a prior art fastener holding two panels together.
Figure 2:
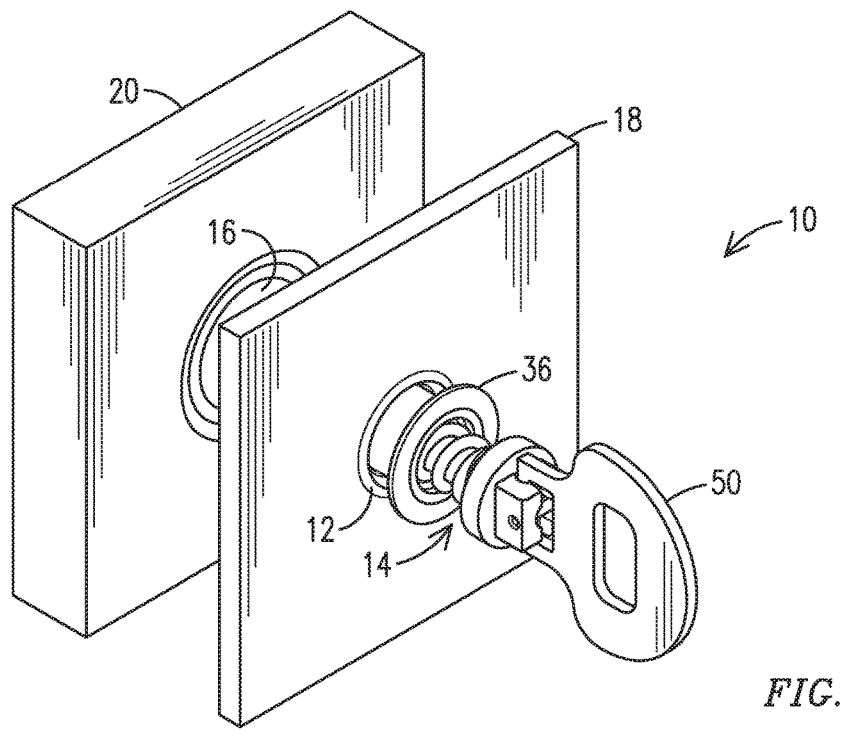
FIG. 2 is a perspective view of a fastener installed in two panels according to embodiments of the present invention.
Figure 3:
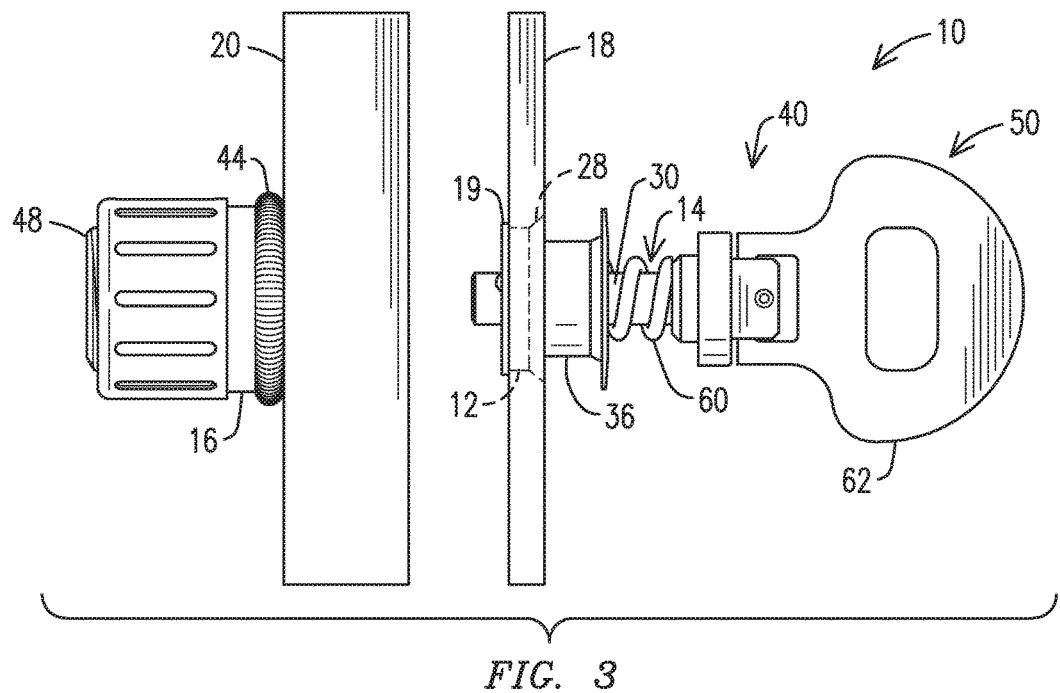
FIG. 3 is a partial section view of the fastener according to embodiments of the present invention.

As can be seen from FIGS. 2 and 3, a fastener, which is designated generally by the reference numeral 10, is of the ¼ turn type, having a grommet 12, a stud 14, and a receptacle 16, and may incorporate the various inventions described and claimed herein. While components of the invention are described in reference to a ¼ turn fastener, the inventions and their parts may be used with other types of quick-release fasteners such as 2× and 4× threaded fasteners.

The fastener 10 holds together two panels 18 and 20, with adjacent sides of the panels in contact with one another, by extending through openings formed in the panels to receive the fastener 10. While the inventions may be described in terms of securing together two panels, the inventions are not intended to be so limited and could be used to secure together various types of components of structures, machines etc.

The grommet 12 has a cylindrical body sized to extend through the opening in one of the panels 18, usually an outer panel, and one end of the cylindrical body has a radially outward extending flange 28 to engage the outer surface of the outer panel 18. The other end of the cylindrical body has a radially outwardly extending shoulder or flange to engage a retaining ring 19 for retaining the grommet 12 on the outer panel 18.

Figure 6:
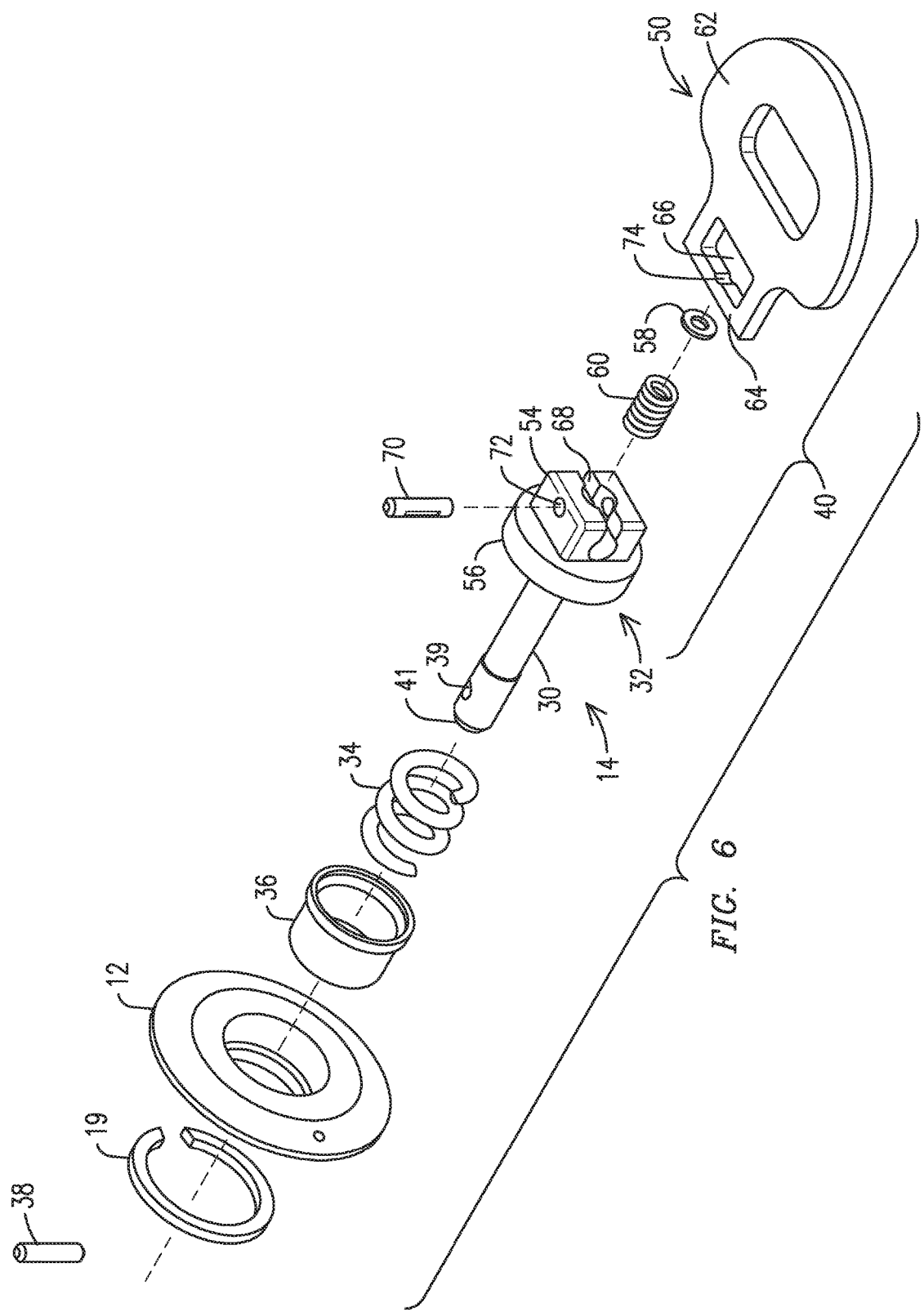
FIG. 6 is an exploded view of the pivoting handle assembly and stud/cup retainer assembly according to embodiments of the present invention.
Figure 7A:
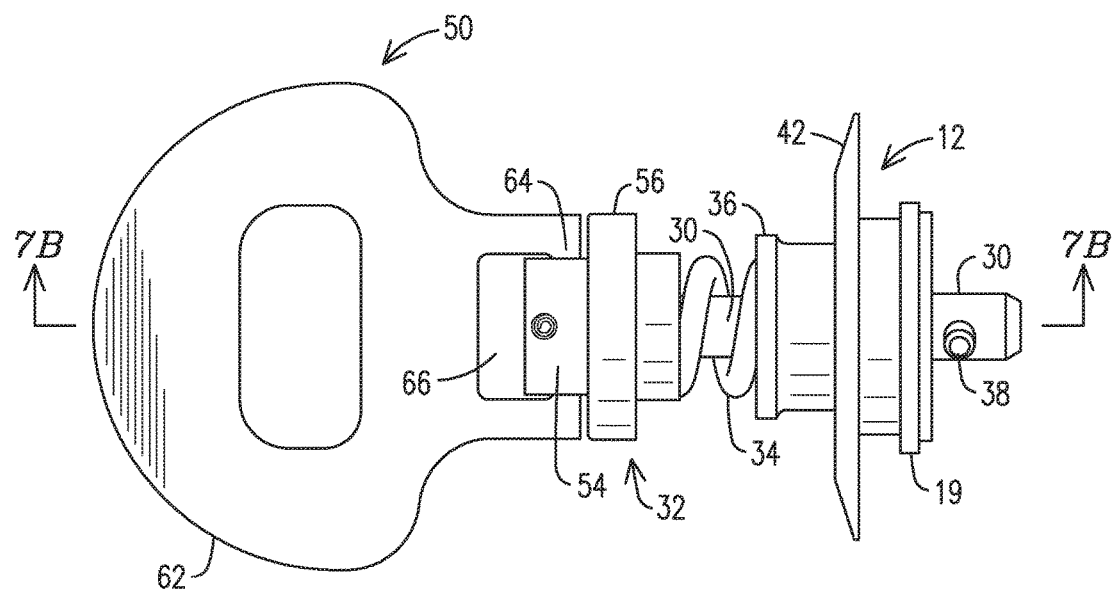
FIGS. 7A-7B include views of the pivoting handle assembly according to embodiments of the present invention.
Figure 7B:
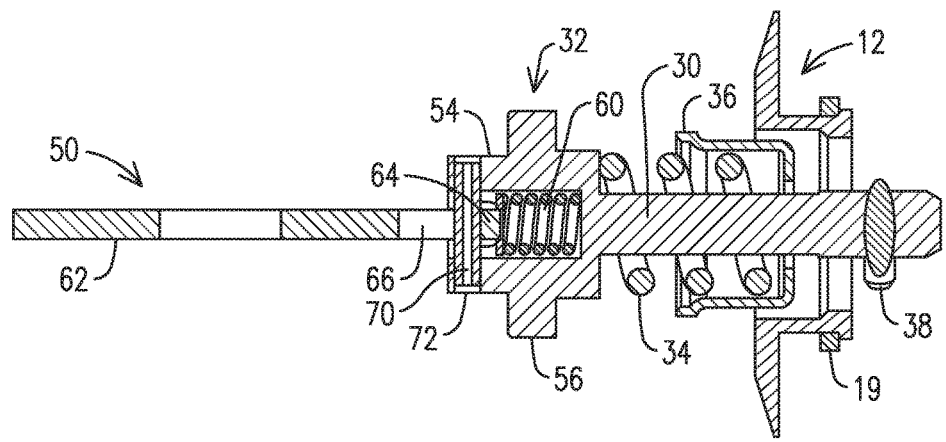
Figure 8A:
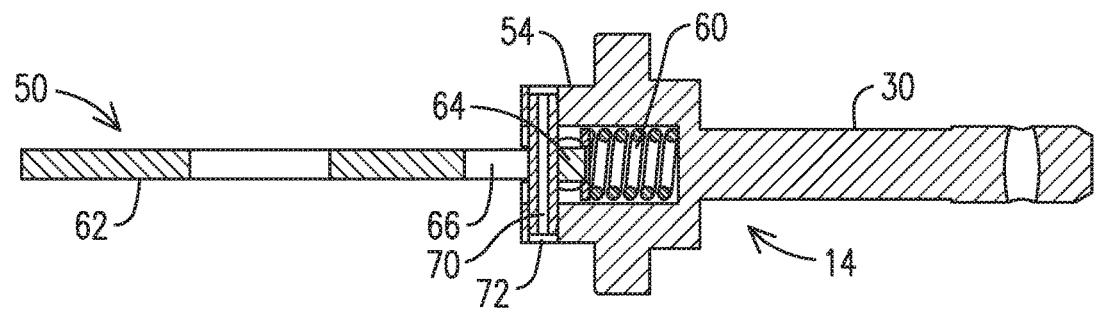
FIGS. 8A-8B include sectional views of the pivoting handle assembly according to embodiments of the present invention.
Figure 8B:
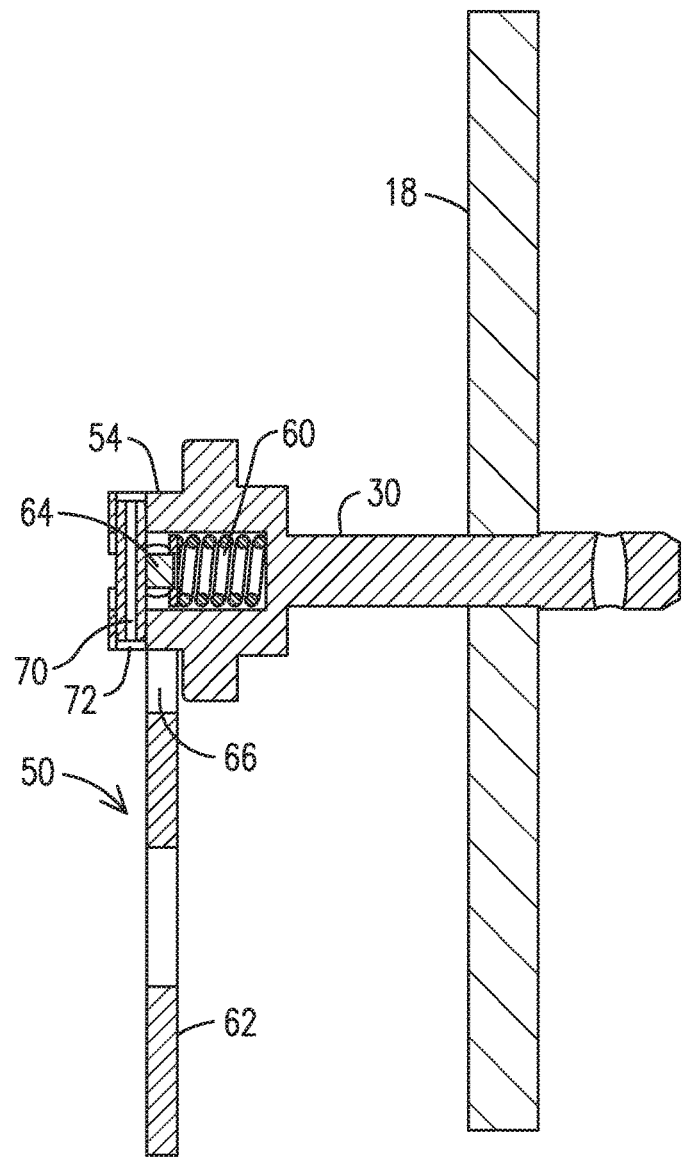

As illustrated in FIG. 6, the stud 14 has a shaft 30, a head 32 and a cross pin 38 extending through an opening 39 in the shaft 30 at an end 41 opposite to the head 32. A cup member 36 is slidable along the shaft 30 and a spring 34 on the shaft 30 between the head 32 and cup member 36 biases the stud 14 relative to the panel 18. This arrangement keeps the head 32 of the stud 14 biased by the spring 34 slightly outward from the radially outward extending flange 28 at the outer side of the outer panel 18. The end 41 of the shaft 30 extends through an opening in the outer panel 18, and the cross pin 38 positioned in the opening 39 in the shaft 30, prevent the assembly of the grommet 12 and the stud 14 from separating from the outer panel 18.

As shown in FIGS. 6-11, the stud 14 includes a pivoting handle assembly 40, and as will be explained in more detail below the handle assembly 40 controls the manipulation of the stud 14 relative to the receptacle 16 to secure the panels 18 and 20. The receptacle 16 may be the type disclosed in U.S. Pat. No. 5,716,180 (the '180 Patent); U.S. Pat. No. 5,795,122 (the '122 Patent); U.S. Pat. No. 7,997,843 (the '843 Patent); and, U.S. Pat. No. 8,282,329 (the '329 Patent), which are incorporated herein by reference. In another embodiment, the receptacle 16 shown in FIGS. 3, 4A-4C and 5A-5D may be of a rivet nut type installed on a backside of panel 20 that may not otherwise be accessible after installation of panel 20.

Figure 4A:
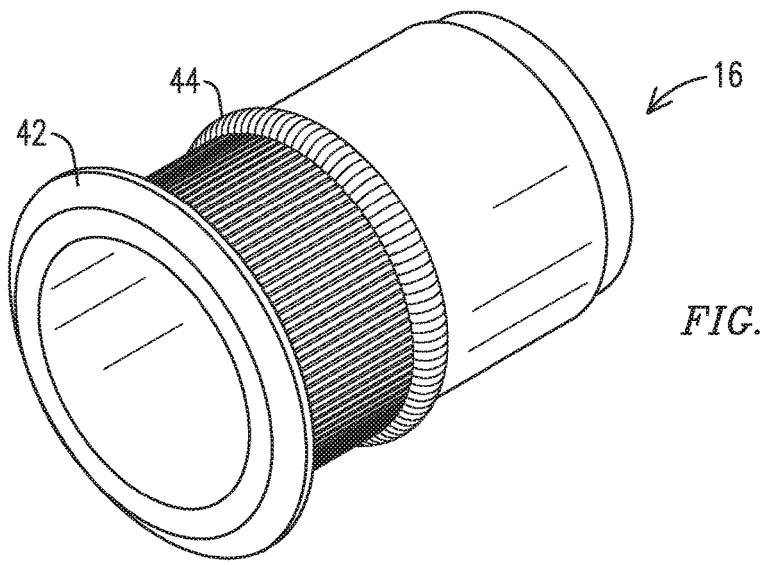
FIGS. 4A-4C include various views of a receptacle with a fastener insert according to embodiments of the present invention.
Figure 4B:
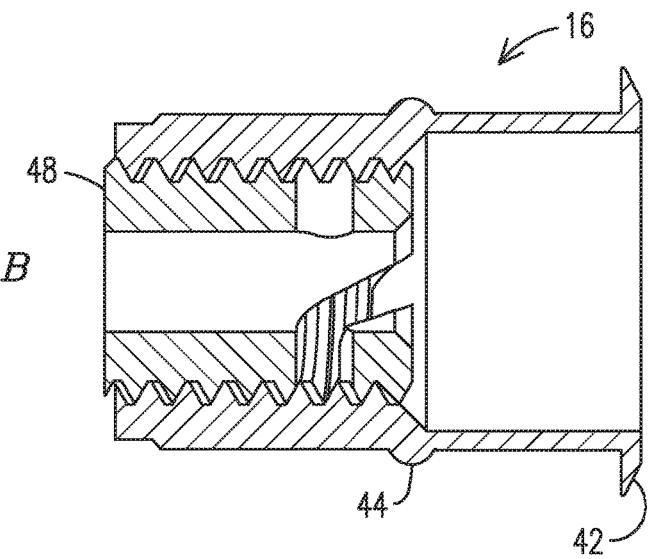
Figure 4C:
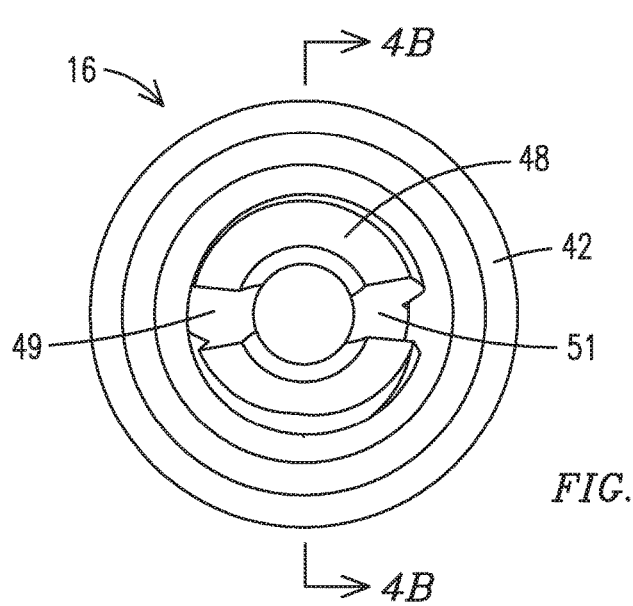

More specifically, the receptacle 16 (or rivet nut) is inserted through a hole in the inside panel 20, which may have a counter bore in which flange 42 is seated. A rivet screw (not shown), which is known to those skilled in the art for securing rivet nuts to panels, frame members and the like, is then inserted and threaded into the receptacle 16 to crimp the outer surface of the receptacle against a backside of the panel 20 forming the bulge 44 anchoring the receptacle 16 to the panel 20. An insert 48 (or barrel member) is then passed through a central opening of the receptacle 16 and secured within the receptacle 16, similar to those inserts or barrel members described in the '180, '122, '843 and '329 Patents having external threads that engage the internal threads of the receptacle 16. The insert 48 also includes a central opening large enough to receive the end 41 of the shaft 30 of the stud 14. As illustrated in FIGS. 4B-4C, diametrically opposed curved slots 49, 51 are provided on the insert 48 for receiving the cross pin 38 of the stud 14. These slots 49, 51 form cam and locking surfaces leading to apices beyond which the slots 49, 51 curve back toward and end of the insert 48 facing the grommet 12 to define locking surfaces for the cross pin 38. Depending on the panel 18, 20 thicknesses and the length of the stud shaft 30, the insert 48 is threaded into the receptacle 16 until the insert 48 is positioned at a correct depth setting, such that the slots 49, 51 are positioned to define the cam and locking surfaces with the cross pin 38.

Figure 5A:
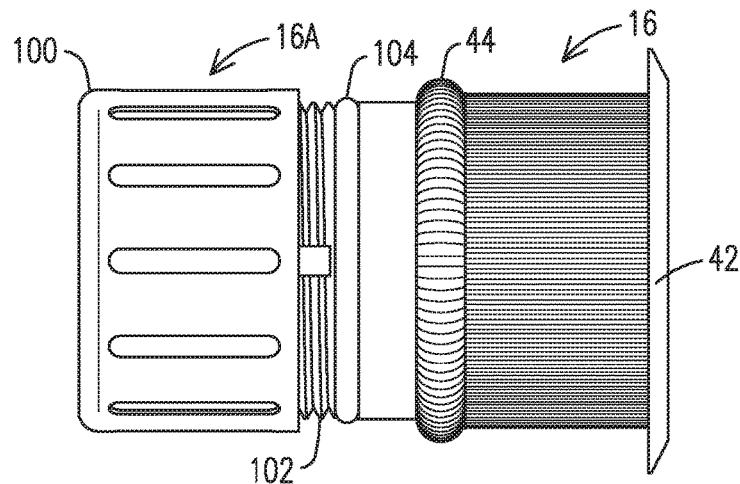
Figure 5B:
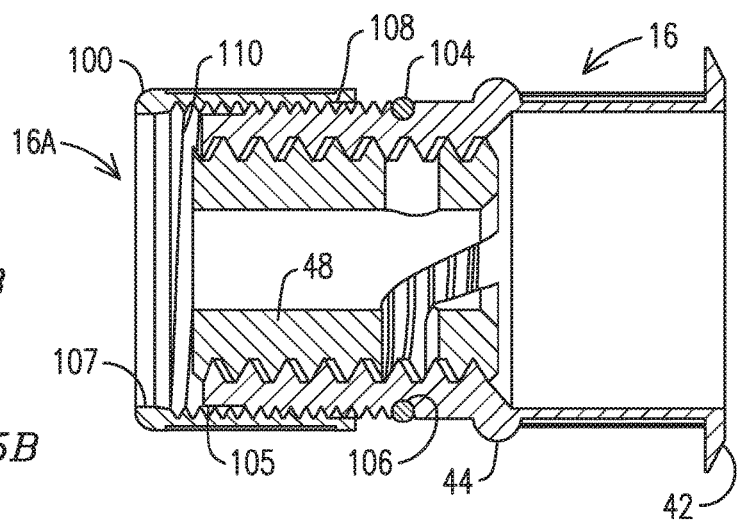
Figure 5C:
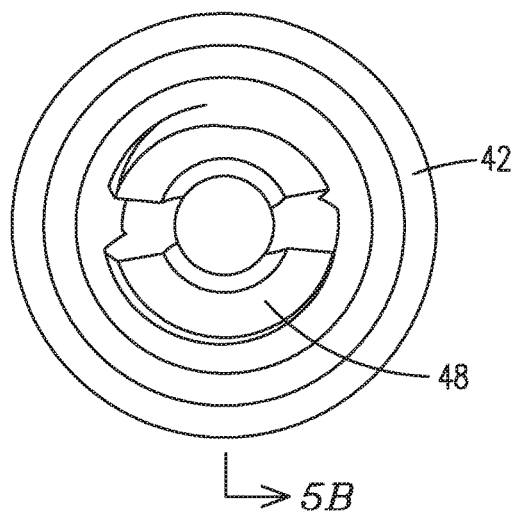

After the insert 48 has been positioned at the correct depth setting within the receptacle 16, the insert 48 is locked or affixed within the receptacle 16 so the position of the insert 48 is not longitudinally adjustable within the receptacle 16, using various methods. In one embodiment, the insert 48 may be treated with an adhesive such as Loctite® to lock or affix the insert 48 in the receptacle 16. In another embodiment shown in FIGS. 5A-5D, the receptacle 16 may have external threads 102 for receiving a lock cap 100 and lock the insert 48 in the receptacle 16. Internal threads 110 of the cap 100 engage the external threads 102 of the receptacle 16, to compress the receptacle 16 against the insert 48. In an exemplary embodiment, a circumference of the cap 100 or the receptacle 16 may be tapered from one end to another end, including external tapered threads 102 on the receptacle 16 and internal tapered threads 110 on the cap 100. This tapered arrangement of the cap 100 and the receptacle 16 enhances the compressive force exerted by the receptacle 16 on the insert 48, as the external tapered threads 102 of the receptacle 16 engage with internal tapered threads 110 of the cap 100. By threadably engaging the cap 100 over the receptacle 16, the receptacle 16 is pressed inward against the insert 48, thereby locking the insert 48 within the receptacle 16 and preventing the insert 48 from becoming dislodged from the receptacle 16. As illustrated in FIG. 5D, a plurality of slots 103 are formed along the external threads 102 of the receptacle 16, to divide the external threads 102 of the receptacle 16 into compressible sections that bend inward and press against the insert 48, upon engagement of the internal threads 110 of the cap 100 with the external threads 102 of the receptacle 16. As illustrated in FIG. 5B, the receptacle 16 includes a tapered end 105 at one end beyond the external threads 102, where an outer diameter of the tapered end 105 decreases towards the end of the receptacle 16. Upon the threaded engagement of the cap 100 with the receptacle 16, a seat 107 at an opening 16A of the cap 100 engages the tapered end 105 and presses the tapered end 105 inward against the insert 48, to lock the insert 48 within the receptacle 16 and prevent rotation of the insert 48. In an exemplary embodiment, an inner diameter of the seat 107 at the opening 16A is less than an outer diameter of the tapered end 105, to enhance the compressive force of the seat 107 against the tapered end 105. While this particular invention including the lock cap 100 is shown in combination with rivet nut receptacle 16, this invention is intended to be used with other fastener receptacles, and in particular ¼ turn fastener receptacles. For example, the invention could be used with the ¼ fasteners of the '180, '122, '843 and '329 Patents.

After the insert 48 is locked within the receptacle 16, structural components are provided to prevent loosening of the insert 48 from its locked position within the receptacle 16. As illustrated in FIG. 5B, an O-ring 104 is seated in a groove 106 on an exterior of the receptacle 16 spaced from the bulge 44 toward the end of the receptacle 16 opposite to the flange 42. As shown in FIGS. 5A-5B, the groove 106 and O-ring 104 are disposed adjacent to the external threads 102. The cap 100 is internally threaded with internal threads 110. As the cap 100 is threaded onto the receptacle 16 radial forces or torsional forces are applied to the receptacle 16 and consequently the insert 48. The cap 100 includes an internal groove 108 that seats against the O-ring 104 when the cap 100 is tightened on the receptacle 16 so that when the internal groove 108 engages the O-ring 104, a predetermined amount of torque is required to longitudinally adjust the insert 48 within the receptacle 16. The engagement between the internal groove 108 and the O-ring 104 may be biased such that a level of resistance during tightening of the internal groove 108 on the O-ring 104 is greater than a level of resistance during loosening of the internal groove 108 from the O-ring 104. The engagement between the internal groove 108 and the O-ring prevents longitudinal adjustment of the insert 48 within the receptacle 16, as may occur when the panels 18, 20 and fastener 10 are subjected to vibrational forces. To that end, the O-ring 104 is positioned at a predetermined location relative to the end of the receptacle 16 such that when the internal groove 108 engages the O-ring 104 a set number of turns or rotations of the cap 100 will set the predetermined torque amount. This torque amount can then be adjusted by longitudinally adjusting the position of the insert 48 in the receptacle 16.

The pivoting handle assembly 40 is shown in detail in FIGS. 6-11 and includes a handle 50 operatively connected to the head 32 of the stud 14 to fold or pivot between an upright position (FIG. 8A) whereby the handle 50 is generally perpendicular to the panel 18 and a folded position (FIG. 8B) whereby the handle 50 is generally parallel to the panel 18. In the upright position, the handle 50 generally enables the quick turning of the stud 14 in the grommet 12 and receptacle 16 to quickly unfasten the outer panel 18 relative the inner panel 20 without the need of any specialized tools that fit the fastener 10. When a fastener 10 is installed the handle 50 may be pivoted to the folded position so the handle 50 is not in an obstructive position. In addition, as illustrated in FIG. 8B, the stud head 32 including a block 54 and a platform 56 prevent the handle 50 from pivoting past this folded position and striking the panel 18 surface.

Figure 9A:
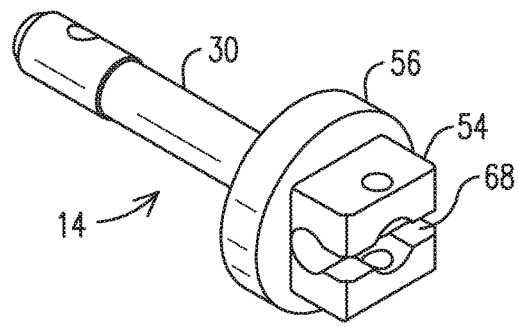
FIGS. 9A-9B include views of the shaft for the pivoting handle assembly according to embodiments of the present invention.
Figure 9B:
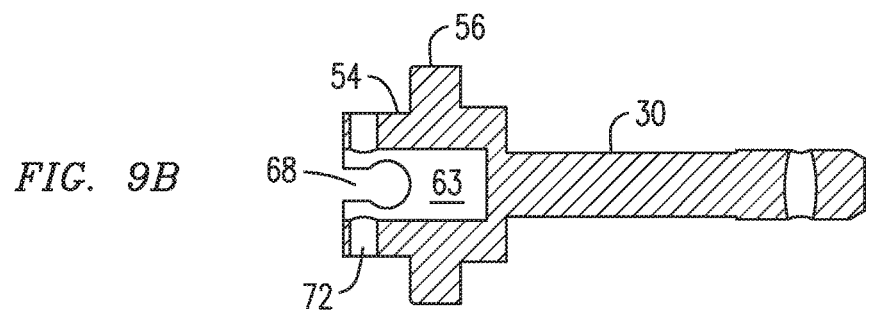

As illustrated in FIGS. 9A-9B, the head 32 of the stud 14 includes the block 54 formed on an enlarged area referred to as a platform 56. As illustrated in FIG. 9B, a central boring 63 is formed through the block 54 and the platform 56 for receiving a biasing mechanism 60 such as a coil/compression spring or one or more spring washers. In the embodiment shown in FIGS. 7A-7B, the biasing mechanism 60 is a compression spring. The biasing mechanism 60 biases the handle 50 or components of the handle against locking surfaces to lock the handle 50 to the stud 14. As shown in FIG. 6, a flat washer 58 may be disposed between the biasing mechanism 60 and the handle 50 to provide planar surfaces that engage the biasing mechanism 60 and handle 50.

Figure 10:
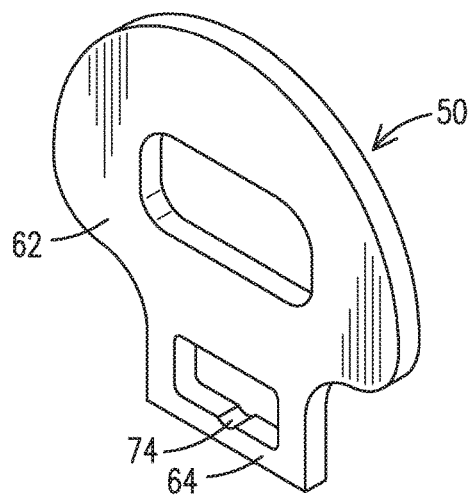
FIG. 10 includes a perspective view of the handle according to one embodiment of the present invention.
Figure 11:
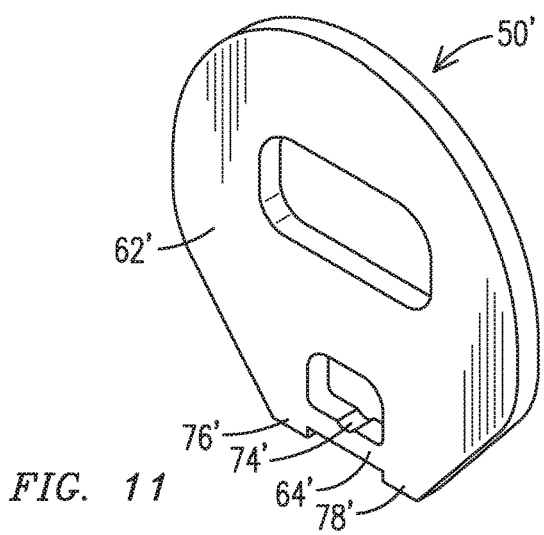
FIG. 11 includes a perspective view of a handle according to an alternate embodiment of the present invention.

The handle 50 includes a main body 62 for grasping and an axle 64 spaced from the main body 62 with an opening 66 there between. The axle 64 is inserted and disposed within a slot 68 (see, FIGS. 9A-9B) that extends through the block 54 laterally relative to a longitudinal axis of the stud 14. A locking pin 70 extends through apertures 72 in the block 54 and the opening 66. Thus, the axle 64 is disposed between the biasing mechanism 60 and the pin 70. The biasing mechanism 60 biases the axle 64/handle 50 outward relative to the boring 63, the block 54 and the stud head 32 and against the pin 70, and thus locks the handle 50 to the stud head 32. As shown in FIG. 10, the axle 64 includes an indentation 74 on or in which the pin 70 is seated. The biasing mechanism 60 biases the indentation 74 against the pin 70, locking the handle 50 on the shaft head 32 and thereby preventing or minimizing lateral movement of the handle 50. FIG. 11 illustrates an additional embodiment of a handle 50' with an axle 64' that includes an indentation 74' to seat the pin 70 and lock the handle 50' to the stud head 32. The axle 64' also includes a pair of legs 76', 78' at opposing ends of the axle 64' that extend outside the slot 68, when the axle 64' is disposed within the slot 68, and support the handle 50' on the platform 56 of the block 54 by preventing the handle 50' from tilting back and forth when the handle 50' is in the upright position. Additionally, the legs 76', 78' prevent the handle 50' from shifting laterally back and forth within the slot 68 when in the upright position, since the legs 76', 78' maintain the indentation 74' in engagement with the pin 70. Additionally, the legs 76', 78' inhibit downward movement of the handle 50' that would compress the biasing mechanism 60 and unlock the pin 70 from the indentation 74'.

While the FIGS. 2, 3 and 6-11 illustrate the pivoting handle assembly 40 in connection with a ¼ turn fastener, the assembly 40 may be used with other types of quick-release fasteners such as quick release screw fasteners, push to lock fasteners, 2× and 4× threaded fasteners.

Figure 12:
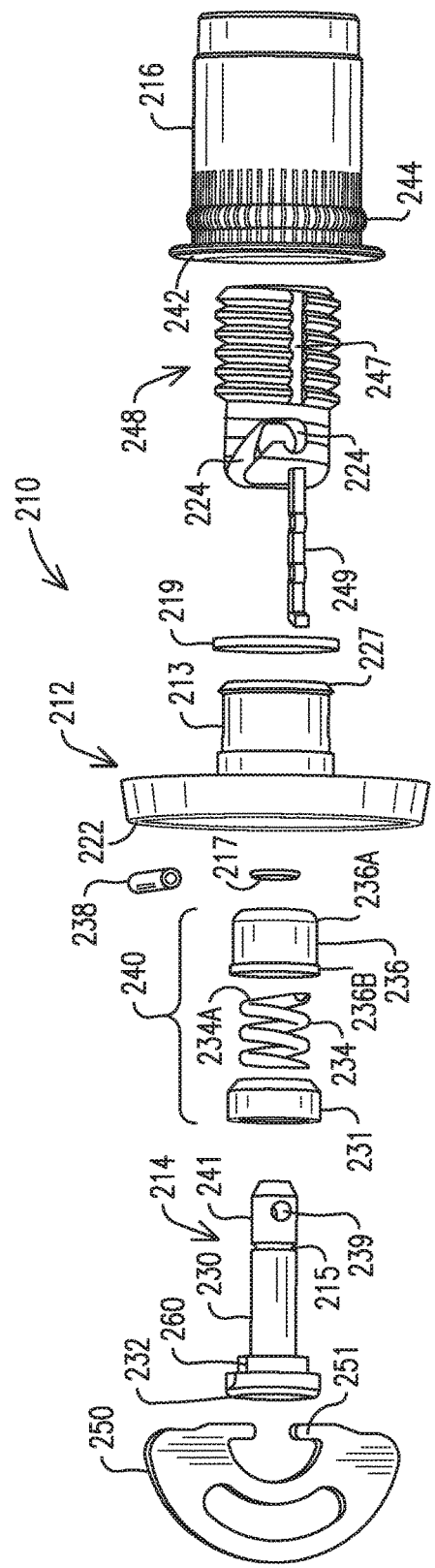
FIG. 12 is an exploded view of an embodiment in accordance with aspects of the invention.
Figure 13:
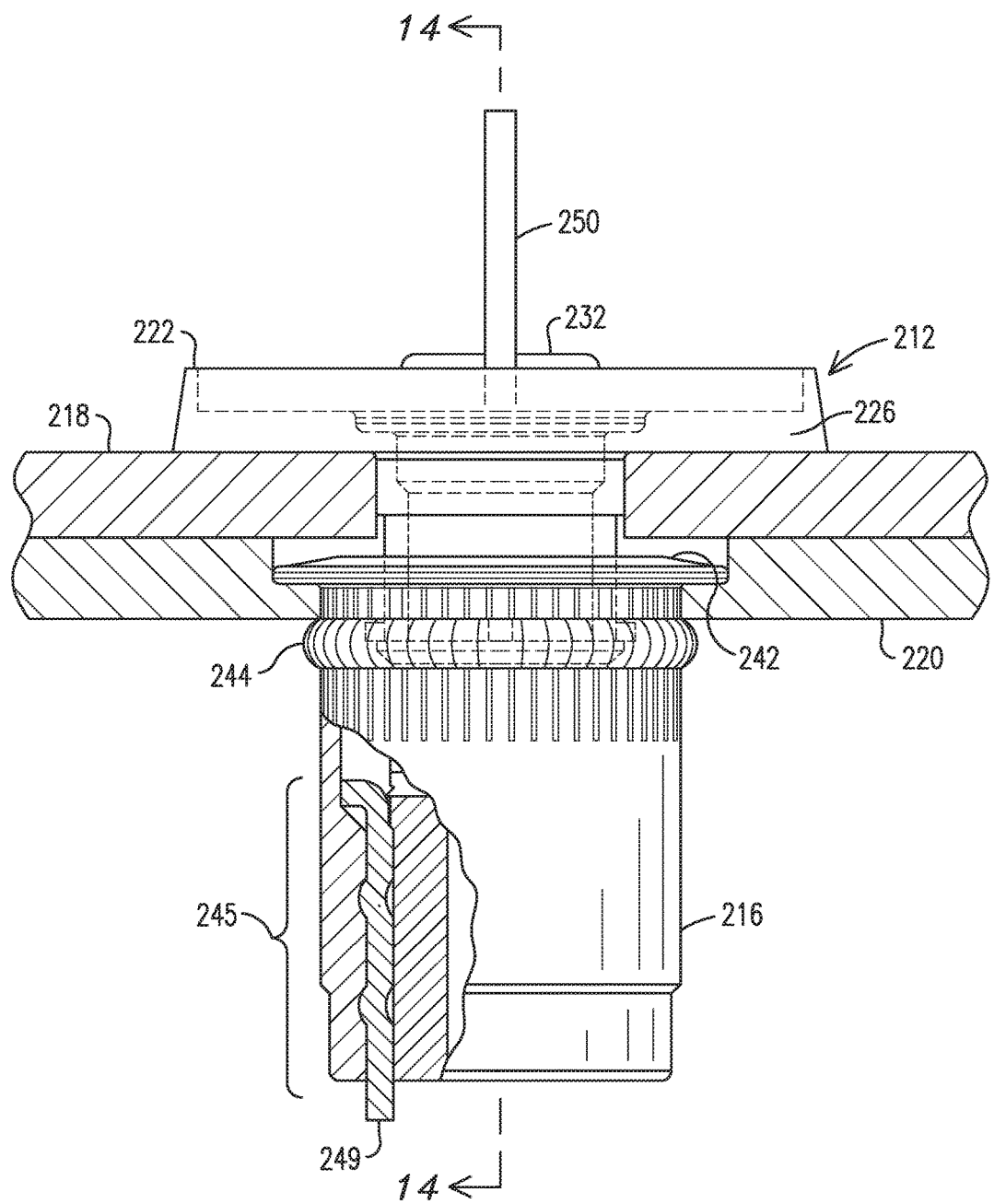
FIG. 13 is a partial sectional view of the fastener components assembled.

With respect to FIGS. 12-14 an embodiment of a fastener 210 is shown. The fastener 210 is of the ¼ turn type, having a grommet 212, a stud 214, and a receptacle 216, and may incorporate the various inventions described and claimed herein. While components of the invention are described in reference to a ¼ turn fastener, the inventions and their parts may be used with other types of quick-release fasteners such as 2× and 4× threaded fasteners.

The fastener 210 holds together two panels 218, 220, (FIG. 13) with adjacent sides of the panels 218, 220 in contact with one another, by extending through openings formed in the panels to receive the fastener 210. While the inventions may be described in terms of securing together two panels, the inventions are not intended to be so limited and could be used to secure together various types of components of structures, machines etc.

The grommet 212 has a cylindrical body 213 sized to extend through the opening in one of the panels, usually an outer panel, and one end of the cylindrical body has a radially outward extending flange 228 to engage the outer surface of the outer panel. The other end of the cylindrical body has a radially outwardly extending shoulder or flange 227 to engage a retaining ring 219 for retaining the grommet 12 on the outer panel 218.

As illustrated in FIGS. 12 and 14, the stud 214 has a shaft 230, a head 232 and a cross pin 238 extending through an opening 239 in the shaft 230 at an end 241 opposite to the head 232. The end 241 of the shaft 230 extends through an opening in the outer panel 218, and the cross pin 238 positioned in the opening 239 in the shaft 30, to prevent the assembly of the grommet 212 and the stud 214 from separating from the outer panel 218. In addition, when panels are secured together, the shaft 230 is inserted through apertures in each of the panels 218 and 220, the grommet 212 and into the receptacle 216. More specifically, the cross pin 238 engages cam and locking surfaces 224 of an insert 248 disposed within the receptacle 216. A handle 250 connected to the head 232 of the stud 214 enables manipulation of the stud 214 relative to the grommet 212 and receptacle 216 for securing together panels 218, 220. Although not shown in the drawings, the cylindrical body 213 of the grommet 212 may include one or more notches for manipulation of the cross-pin 238 and shaft 230 to insert the same through the grommet. The notches preferably include two diametrically opposed notches to accommodate the cross-pin 238, which may be used for cylindrical bodies that are 1½ inches in length or longer.

The receptacle 216 may be the type disclosed in U.S. Pat. No. 5,716,180 (the '180 Patent); U.S. Pat. No. 5,795,122 (the '122 Patent); U.S. Pat. No. 7,997,843 (the '843 Patent); and, U.S. Pat. No. 8,282,329 (the '329 Patent), which are incorporated herein by reference. In another embodiment, the receptacle 216 shown in FIGS. 3, 4A-4C and 5A-5D, and 12-14, 16A and 16B may be of a rivet nut type installed on a backside of panel 220 that may not otherwise be accessible after installation of panel 220. As shown in FIGS. 12 and 14, the receptacle 216 is threaded internally for receiving the insert 248, which is threaded externally. The insert 248 includes a central boring 225 and cam and locking surfaces 224 to receive the shaft 230 and cross pin 238 and secure together panels 218, 220.

Also shown in FIGS. 12 and 13 is a locking mechanism 245 disposed between the receptacle 216 and insert 248 to prevent rotation of the insert 248 relative to the receptacle 216 after the insert 248 has been set in a desired position. The locking mechanism 245 includes a groove 246, semi-cylindrical in cross section, drilled in the inner annular surface of the receptacle 216 in a direction generally parallel to the longitudinal axis of the receptacle 216 and a groove 247, semi-cylindrical in cross section, drilled in the outer annular surface of the insert 248 in a direction parallel to the direction of the groove 246 in the receptacle 216.

Figure 15A:
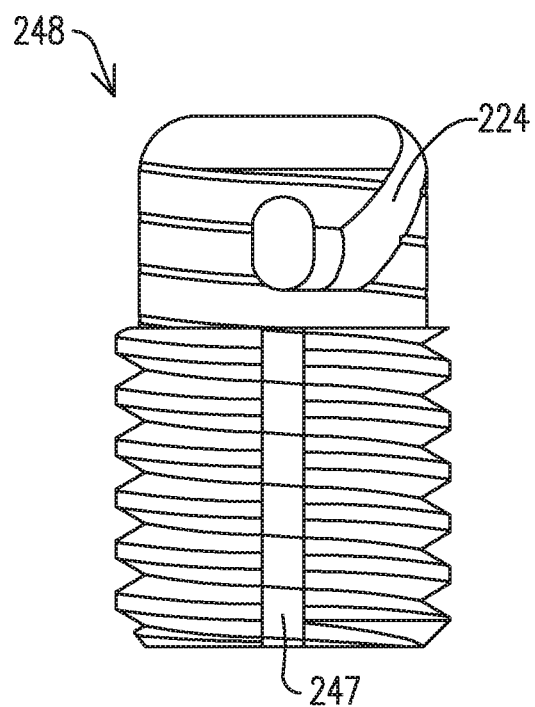
FIG. 15A is an elevational view of a threaded insert in accordance with aspects of the invention.
Figure 15B:
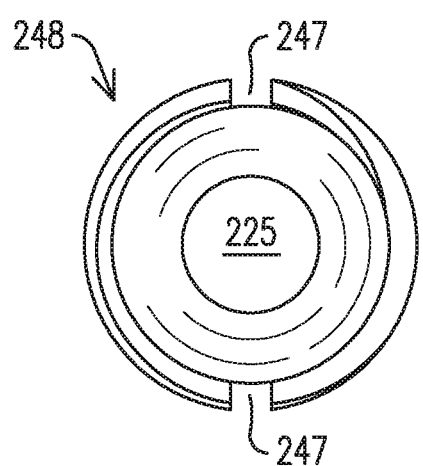
FIG. 15B is a top view of the threaded insert of FIG. 15A
Figure 16A:
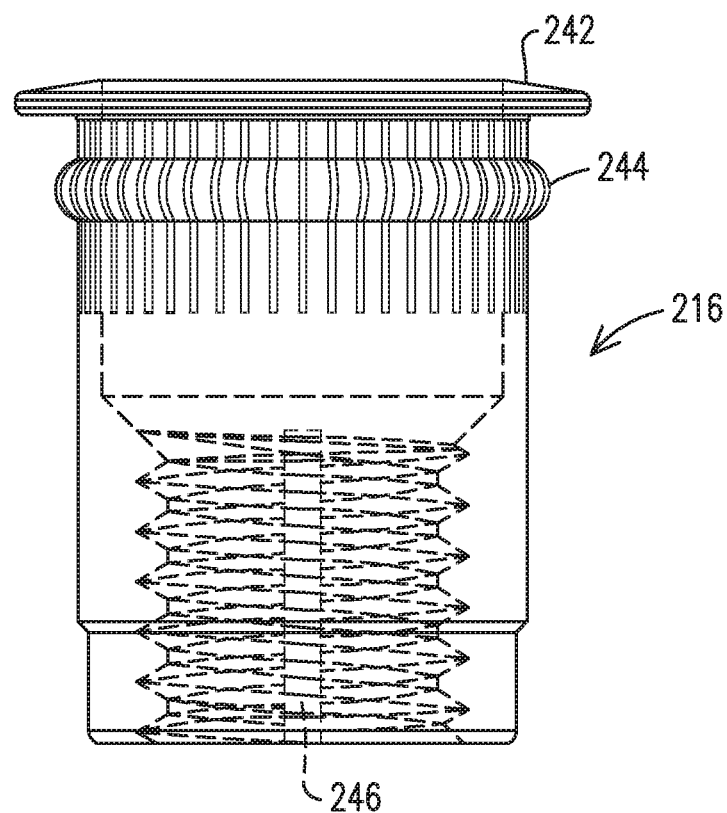
FIG. 16A is an elevational view of a rivet nut receptacle in accordance with aspects of the invention.
Figure 16B:
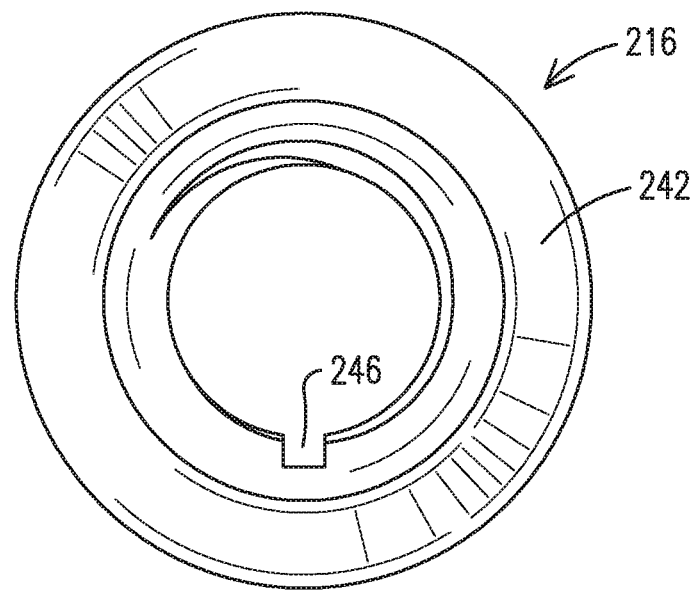
FIG. 16B is a top view of the rivet nut receptacle of FIG. 16A.

In an embodiment shown in FIGS. 15A and 15B, the insert includes two diametrically opposed grooves 247, and the receptacle 216 includes a single groove 246. While this embodiment includes two grooves 247 on the insert, a single groove may be sufficient. The grooves 246, 247 in the receptacle 216 and the insert 248 have the same radius of curvature in cross section. The grooves 246, 247 are in alignment at one point for each half rotation of the insert 248 relative to the receptacle 216 to form. When the insert 248 is in the desired position and the grooves 246 and 247 are in alignment to form a slot, a locking pin 249 is inserted with a tool into the aligned grooves 246, 247 or slot, so that locking pin 249 occupies both grooves and, thereby, prevents rotation of the insert 248 relative to the receptacle 216.

As shown, the locking pin 249 has a convoluted configuration to provide some flexure to the pin so that may bend or flex as it is inserted. To that end, this flexure characteristic provides frictional engagement between the pin 249 and the receptacle 216, and frictional engagement between the pin 249 and the insert 248 to prevent relative rotational movement between the insert 248 and receptacle 216. The invention, however, is not limited to this particular locking mechanism. Other locking mechanisms such as adhesives as the above described use of Loctite may be used. Alternatively, known locking mechanisms such as those disclosed in U.S. Pat. No. 5,716,180 (a collar or band type device), U.S.

Pat. Nos. 5,795,122 and 7,997,843 that prevent relative rotation between an insert and receptacle may be used.

The receptacle 216 may be installed by inserting the receptacle through the aperture 243 of the panel 220, so the flange 242 is preferably seated in a counter bore associated with the aperture 243, thereby supporting the receptacle 216 in the aperture 243 and on panel 220. A rivet nut tool (not shown), as known to those skilled in the art, is then used to crimp the rivet nut receptacle to form bulge 244 against a surface of the panel 220 thereby securing the receptacle 216, with the insert 248, to the second panel 220. Alternatively, the receptacle 216 could be installed on the second panel 220 and then the insert 248 may be installed as described above.

A biasing assembly 240 (also referred to above as a pivoting handle assembly) is shown in FIGS. 12 and 14. The biasing assembly 240, with the handle 250, controls the manipulation of the stud 214 relative to the receptacle 216 to secure the panels 218 and 220 together. More specifically, when the stud 214 is inserted through the panels 218, 220, and into the insert 250 and receptacle 216 and rotated by the handle 250 to engage the cam and locking surfaces 224 the biasing assembly 240 biases the stud 214 outward relative to panels 218, 220 locking the cross pin 238 and stud 214 against the cam and locking surfaces 224. In this manner, with the receptacle 216 affixed to the panel 220, the outward biasing of the stud 214 secures the two panels 218, 220 together.

With respect to FIGS. 12 and 14, the biasing assembly 240 may comprise a biasing mechanism 234, such as compression spring disposed along a portion of the shaft 230. A cup member or housing 236 surrounds at least a portion of the biasing mechanism 234 and is slidable along the shaft 30. As shown in FIG. 14, the housing 236 has a bottom end 236A disposed between a bottom end 234A of the biasing mechanism 234 and a retainer ring 217 on the shaft 230. The retainer ring 217 is seated in an annular groove 215 on the shaft 230. In addition, the assembly 240 includes a spacer 231 disposed between a top end 234B of the biasing mechanism and head 232 of the shaft and between a bottom of the handle 250.

As shown in FIGS. 12 and 14, diametrically opposed notches 260 are formed in the head 232 to receive opposing legs 251 of the handle 250. The shaft 230 and components of the biasing assembly 240 are dimensioned such that when the biasing assembly 240 and the handle 250 are assembled on the shaft 230 of the stud 214, the retainer ring 217 abuts the housing 236 compressing biasing mechanism 236 against the spacer 231. In addition, the spacer 231 is forced against the legs 251 of the handle 250 firmly seating the legs 251 of the handle 250 in the notches 260 of the head 232. In this manner, the handle 250 can be pivoted between an upright position and a down position, and remain in those positions without any outside manipulation.

As further illustrated in FIG. 13, the grommet 212 may include a cylindrical collar 222 integrally connected to the cylindrical body 213 of the grommet 212 or the flange 226 that is connected to the cylindrical body 213. This embodiment of the grommet 212 may be used, for example, on a floor panel to provide an annular protective barrier around the handle 250 when in a folded down position. More specifically, the edges of the handle 250 may not be clipped by someone walking past the fastener, or the handle 250 is preferably seated within a height of the collar 222 to prevent someone from stepping or standing on the handle, or placement of a heavy object directly on the handle 250.

While the FIGS. 12-16B illustrate the pivoting handle assembly 40 in connection with a ¼ turn fastener, the assembly 40 may be used with other types of quick-release fasteners such as quick release screw fasteners, push to lock fasteners, 2× and 4× threaded fasteners.

Figure 14A:
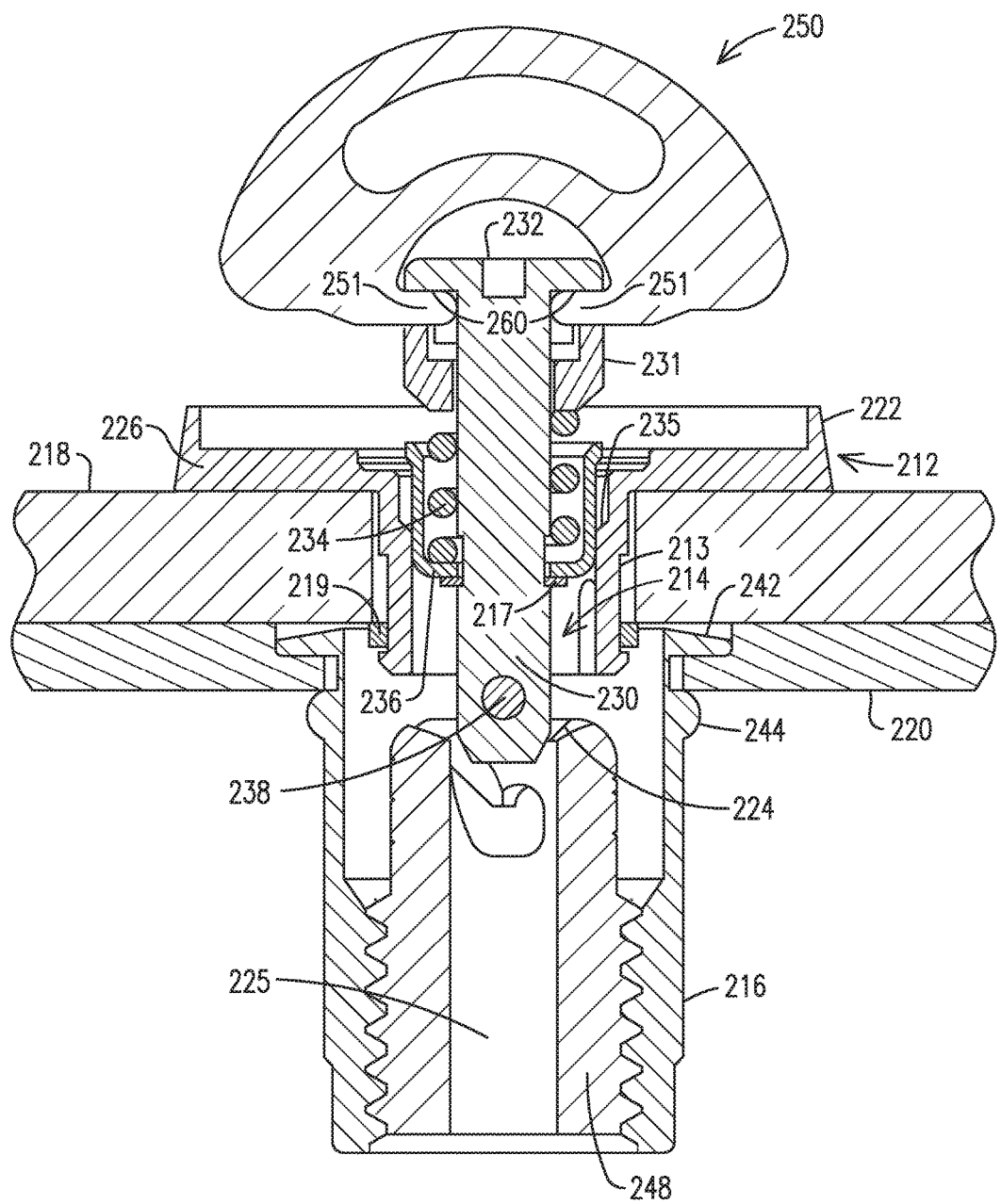
FIG. 14A is a sectional view of the fastener in FIG. 13 taken along line 14-14, wherein the fastener is in an unlocked position.
Figure 14B:
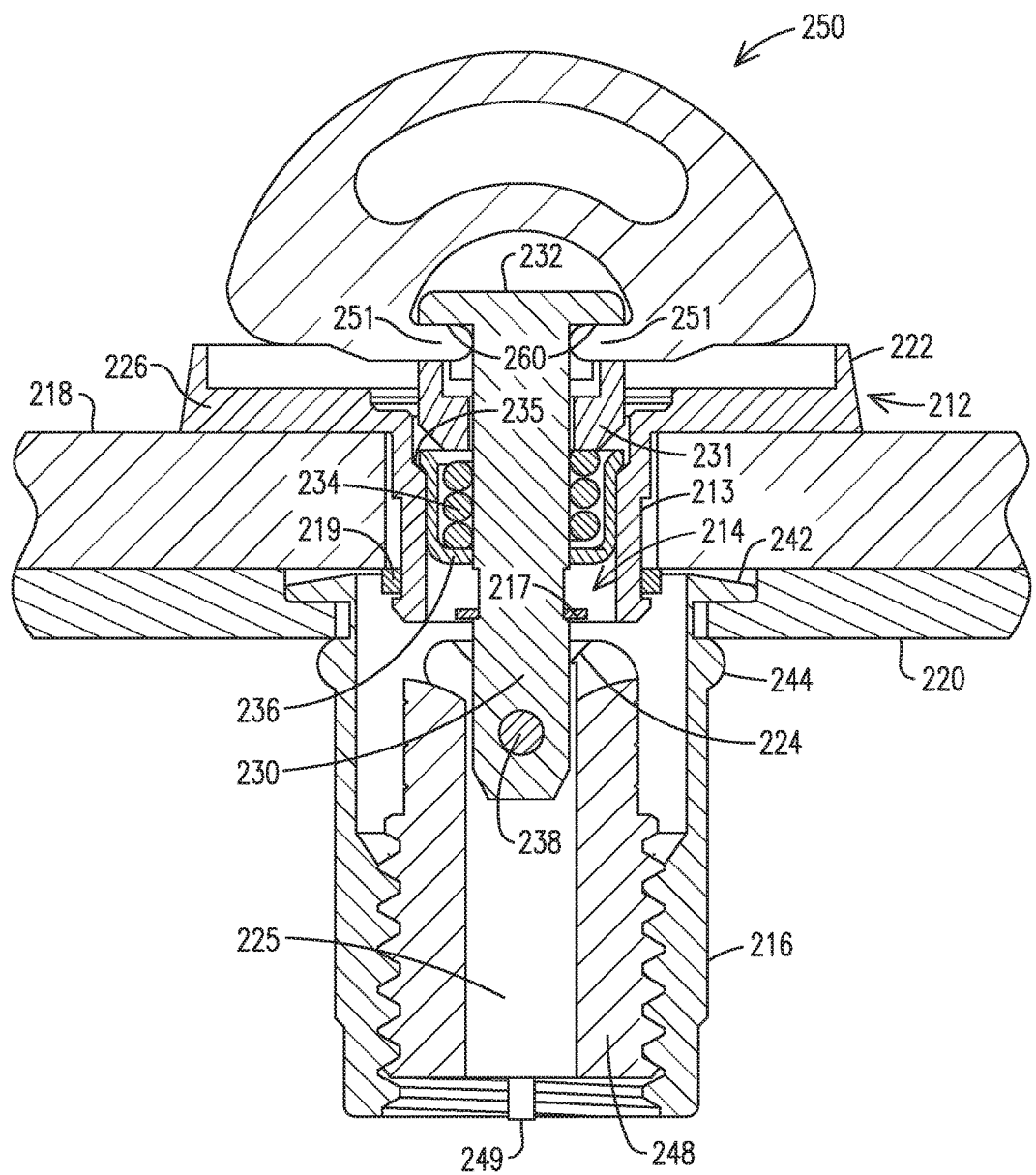
FIG. 14B is sectional view of the fastener of FIGS. 13 and 14A, wherein the fastener is in a locked position.

FIG. 14A shows the handle 250 and fastener 210 are in an unlocked position, in which the stud 214 and cross pin 238 have not been completely inserted into the receptacle 216 to engage the insert 248. With respect to FIG. 14B, the fastener 210 and handle 250 are shown in locked position, wherein a circumferential rim 233 of the housing 231 seats within a corresponding recess 235 in the grommet 212 further compressing spring 234 between the housing 236 and the spacer 231.

Figure 17A:
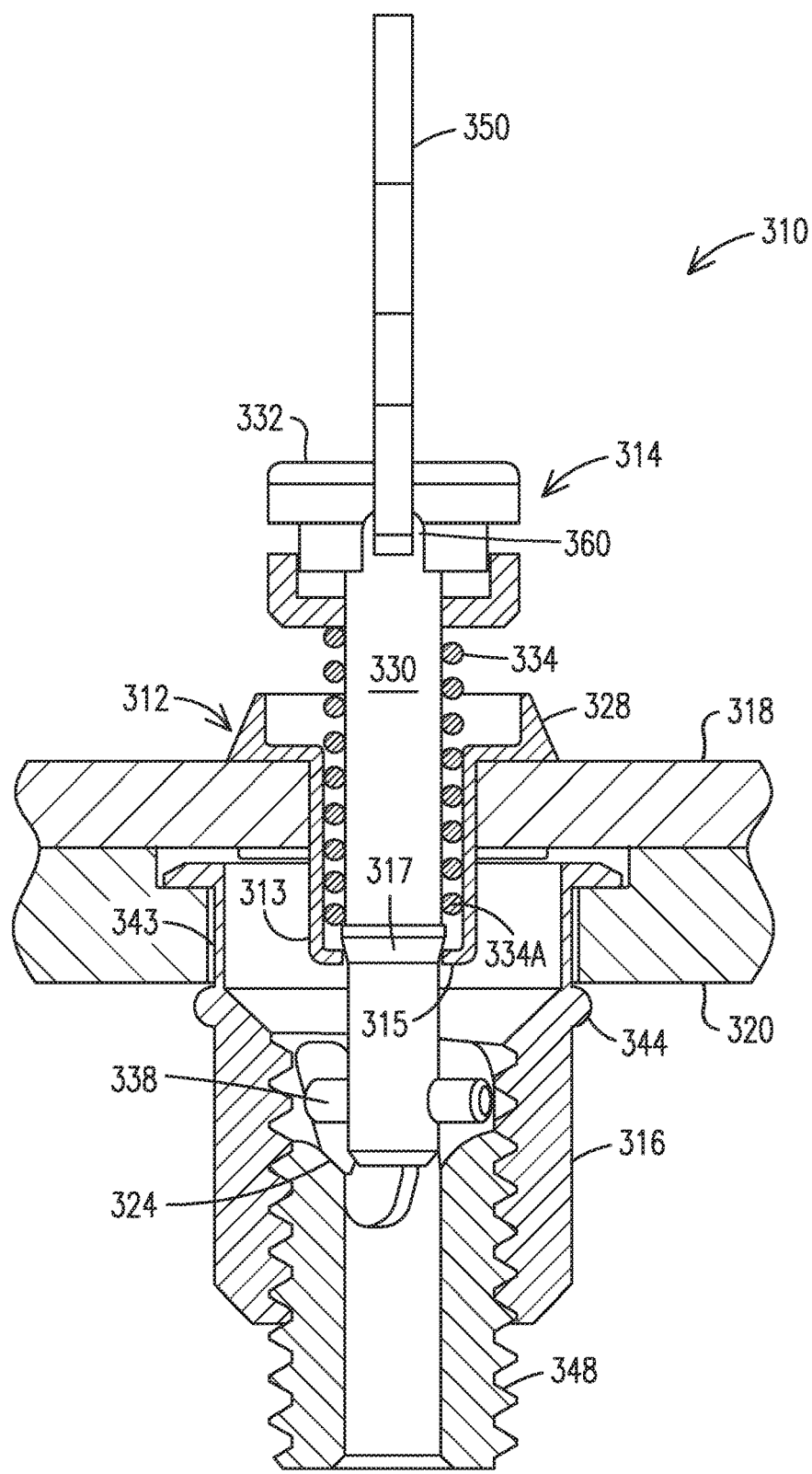
FIG. 17A is a sectional view of an embodiment of the fastener in an unlocked position accordance with aspects of the invention.
Figure 17B:
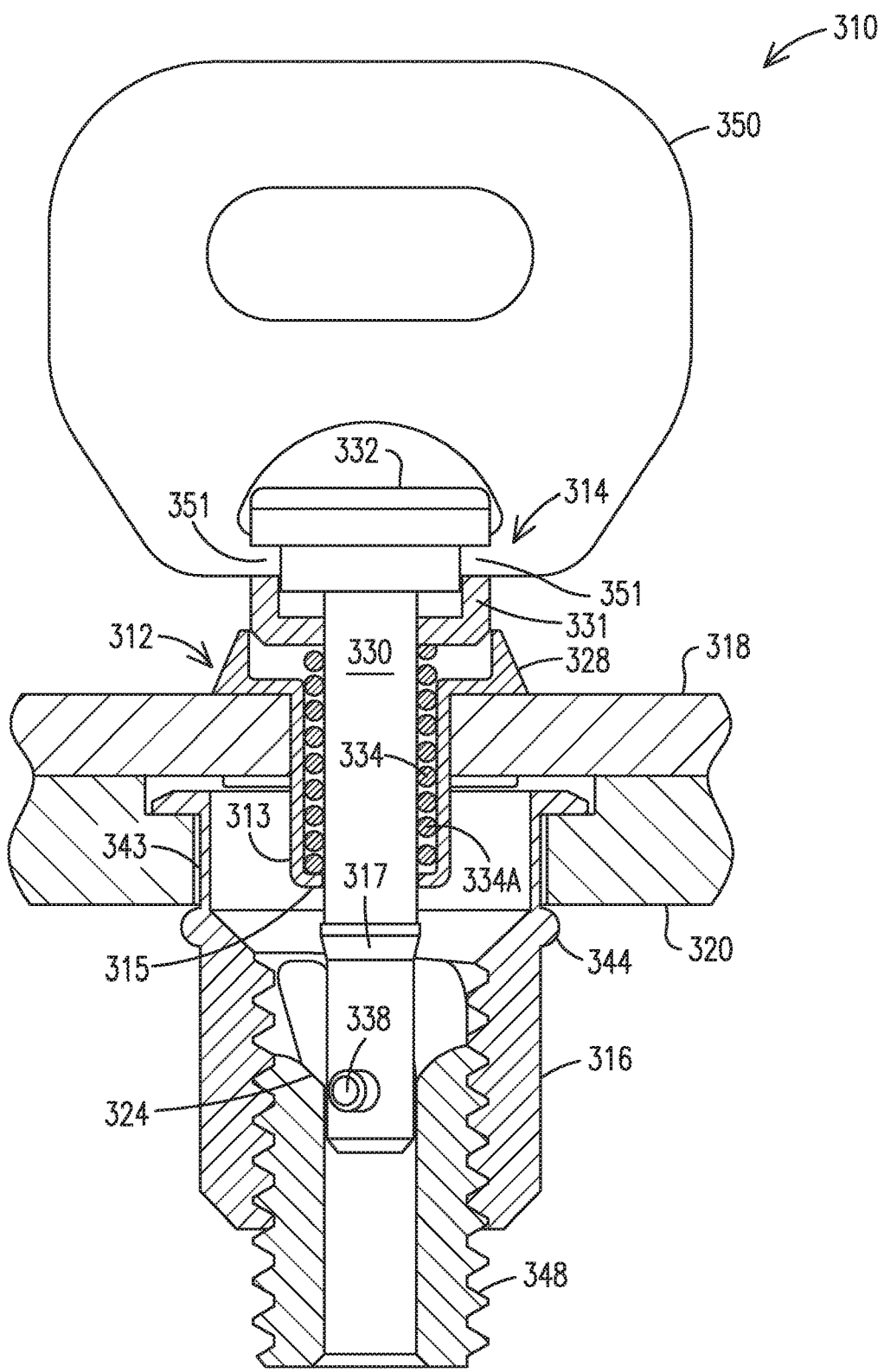
FIG. 17B is a sectional view of the fastener of FIG. 17A in a locked position.

Another embodiment of the invention is shown in FIGS. 17A, 17B and 18. The fastener 310 is of the ¼ turn type, having a grommet 312, a stud 314, and a receptacle 316, and may incorporate the various inventions described and claimed herein. While components of the invention are described in reference to a ¼ turn fastener, the inventions and their parts may be used with other types of quick-release fasteners such as 2× and 4× threaded fasteners.

The fastener 310 holds together two panels 318, 320, with adjacent sides of the panels 318, 320 in contact with one another, by extending through openings formed in the panels to receive the fastener 310. While the inventions may be described in terms of securing together two panels, the inventions are not intended to be so limited and could be used to secure together various types of components of structures, machines etc.

The grommet 312 has a cylindrical body 313 sized to extend through the opening in one of the panels, usually an outer panel, and one end of the cylindrical body 313 has a radially outward extending flange 328 to engage the outer surface of the outer pane 318. As will be explained in more detail below, in an embodiment the cylindrical body 313 may comprise a lip 315 extending radially inward toward the stud 314 to engage and support a compression spring to secure a handle 350 to a head 332 of the stud 314.

As illustrated in FIGS. 17A, 17B, and 18, the stud 314 has a shaft 330, a head 332 and a cross pin 338 extending through an opening 239 in the shaft 330 at an end 241 opposite to the head 332. The end 241 of the shaft 330 extends through an opening in the outer panel 318, and the cross pin 338 positioned in the opening 339 in the shaft 330, to prevent the assembly of the grommet 212 and the stud 314 from separating from the outer panel 318. In addition, when panels are secured together, the shaft 330 is inserted through apertures in each of the panels 318 and 320, the grommet 312 and into the receptacle 316. More specifically, the cross pin 338 engages cam and locking surfaces 224 of an insert 348 disposed within the receptacle 316.

A handle 350 connected to the head 332 of the stud 314 enables manipulation of the stud 314 relative to the grommet 512 and receptacle 316 for securing together panels 318, 320. Although not shown in the drawings, the cylindrical body 313 of the grommet 312 may include one or more notches for manipulation of the cross-pin 338 and shaft 330 to insert the same through the grommet 312. The notches preferably include two diametrically opposed notches to accommodate the cross-pin 338, which may be used for cylindrical bodies that are 1½ inches in length or longer.

The receptacle 316 may be the type disclosed in U.S. Pat. No. 5,716,180 (the '180 Patent); U.S. Pat. No. 5,795,122 (the '122 Patent); U.S. Pat. No. 7,997,843 (the '843 Patent); and, U.S. Pat. No. 8,282,329 (the '329 Patent), which are incorporated herein by reference. In another embodiment, the receptacle 316 shown in FIGS. 3, 4A-4C and 5A-5D, and 12-14, 16A and 16B may be of a rivet nut type installed on a backside of panel 320 that may not otherwise be accessible after installation of panel 320. As shown in FIGS. 12 and 14, the receptacle 316 is threaded internally for receiving the insert 348, which is threaded externally. The insert 348 includes a central boring 325 and cam and locking surfaces 224 to receive the shaft 330 and cross pin 338 and secure together panels 318, 320.

The receptacle 316 may be installed by inserting the receptacle 316 through the aperture 343 of the panel 320, so the flange 342 is preferably seated in a counter bore associated with the aperture 343, thereby supporting the receptacle 316 in the aperture 343 and on panel 320. A rivet nut tool (not shown), as known to those skilled in the art, is then used to crimp the rivet nut receptacle to form bulge 344 against a surface of the panel 320 thereby securing the receptacle 316, with the insert 348, to the second panel 320. Alternatively, the receptacle 316 could be installed on the second panel 320 and then the insert 348 may be installed as described above.

A biasing assembly 340 (also referred to above as a pivoting handle assembly) is shown in FIGS. 17A and 17B. The biasing assembly 340, with the handle 350, controls the manipulation of the stud 314 relative to the receptacle 316 to secure the panels 318 and 320 together. More specifically, when the stud 314 is inserted through the panels 318, 320, and into the insert 350 and receptacle 316 and rotated by the handle 350 to engage the cam and locking surfaces 324 the biasing assembly 340 biases the stud 314 outward relative to panels 318, 320 locking the cross pin 338 and stud 314 against the cam and locking surfaces 224. In this manner, with the receptacle 316 affixed to the panel 320, the outward biasing of the stud 314 secures the two panels 318, 320 together.

The biasing assembly 340 may comprise a compression spring 334 disposed along a portion of the shaft 330. The cylindrical body 313 of the grommet 312 surrounds at least a portion of the spring 334 and is slidable along the shaft 330. As shown, a retainer ring 317 in the form of a circumferential ridge integrally formed on the shaft 330 between the head 332 and the second end of the shaft. The bottom end 334A of the spring 334 engages the retainer ring or ridge 317. In addition, the assembly 340 includes a spacer 331 disposed between a top end 234B of the spring and head 332 of the shaft and between a bottom of the handle 350.

With respect to FIGS. 17A and 18, diametrically opposed notches 360 are formed in the head 332 to receive opposing legs 351 of the handle 350. The shaft 330 and components of the biasing assembly 340 are dimensioned such that when the biasing assembly 340 and the handle 350 are assembled on the shaft 330 of the stud 314, the spring 334 abuts the ridge 317 biasing the spacer 331 against the handle 350. More specifically, a bottom end 334A of the spring 334 is disposed against the ridge 317 and a top end 334B of spring 334 is disposed against the legs 351 of the handle 350. The retainer ring 317 holds the spring 334 in a compressed state so the handle 350 can be pivoted between a closed, down position and an open/upright position. In this manner, the handle 350 can be pivoted between an upright position and a down position, and remain in those positions without any outside manipulation.

While this embodiment includes the retainer ring 317, embodiments may not require a retainer ring. For example, for fasteners with a shorter stud, the spring 334 may be held in compression by the bottom end of the bottom end of a grommet, which abuts the cross pin 338. With respect to FIG. 19, a grommet 312, according to aspects of the invention, is shown in a sectional view. More specifically, the grommet 312 includes a radially and inwardly lip 315 at the end of the grommet 312 distal the flange 328 and is configured to engage or support the bottom end 334A of the spring 334 in a compressed state when a shorter stud may be used. In such an embodiment, the shaft 330 may not include the above described retainer ring or ridge 317, and end of the grommet 312 abuts the cross pin to hold the spring 334 in a compressed state so the handle can be pivoted between a closed/down position or an open/vertical position.

If the fastener 310 includes a longer shaft 330 with a retainer ring or ridge 317, the spring 334 is held in a compressed state in part by the position of the ridge 317 on the shaft 330. When the fastener 310 is in a locked position, as shown in FIG. 17B, the stud 316 has been pressed into the insert with the cross pin 338 engaging the cam and locking surfaces 324 of the insert 348. In such an embodiment, the opening 317 in the bottom end of the grommet 312 is sized to slide over the ridge 317 when the fastener 310 is in the locked position. As shown in FIGS. 17A and 17B, the ridge 317 has a tapered configuration to enable the sliding of the stud 314 relative to the grommet 312 between an unlocked position (FIG. 17A) and a locked position (FIG. 17B).

While the FIGS. 17A, 17B, 18 and 19 illustrate the pivoting handle assembly 340 in connection with a ¼ turn fastener, the assembly 340 may be used with other types of quick-release fasteners such as quick release screw fasteners, push to lock fasteners, 2× and 4× threaded fasteners.

While the preferred embodiments of the present invention have been shown and described herein, it will be obvious that such embodiments are provided by way of example only. Numerous variations, changes and substitutions will occur to those of skill in the art without departing from the invention herein. Non-limiting examples include a component that is described above as being attached to one part of the apparatus may alternatively be attached to a different part of the apparatus in other embodiments. Parts described as being indirectly connected may be connected directly to each other, and vice versa. Component parts may be assembled from individual pieces or may be integrally formed as a single unit. Alternative types of connectors and alternative materials may be used. The apparatus may be used with other types of power tools. Accordingly, it is intended that the invention be limited only by the spirit and scope of the appended claims.

The invention claimed is:

1. A fastener for securing a first panel to a second panel, wherein the first panel and the second panel each include an aperture and the apertures are aligned for receiving the fastener, the fastener comprising:
   a stud including a shaft, a head at a first end of the shaft and distal to a second end of the shaft, wherein the shaft and second end of the shaft are insertable through the apertures in the first and second panels;
   a handle that is pivotally connected to the head of the stud;
   a spring disposed along the shaft between the head of the stud and the second end of the shaft;
   a grommet having a flange portion and cylindrical body connected to the flange and the cylindrical body surrounds at least a portion of the spring and at least a portion of the shaft;
   a retainer ring on the shaft between the head of the stud and the second end of the shaft;
   a spacer between the handle and spring, and the spacer is in contact with the handle and spring; and,
   wherein the spring has a top end in contact with the spacer and a bottom end in contact with the retainer ring when in an unlocked position and in contact with an interior surface of the cylindrical body of the grommet, when in a locked position.

2. The fastener of claim 1 wherein the retainer ring is a circumferential ridge integrally formed on the shaft.

3. The fastener of claim 2 wherein the receptacle is a rivet nut.

4. The fastener of claim 1 further comprising:
a receptacle mounted to a second side of the second panel facing away from the first panel and at the aperture of the second panel, and the receptacle includes an internally threaded surface; and,
an insert configured for threaded engagement with the receptacle, and the insert having cam and locking surfaces to be engaged by a cross pin on the shaft.

5. The fastener of claim 4 further comprising a locking mechanism at least a portion of which is disposed between the receptacle and the insert to lock the insert in a position within the receptacle.

6. The fastener of claim 5 wherein the locking mechanism is a locking pin disposed within an axial groove in an outer surface of the insert that is aligned with an axial groove in an inner surface of the receptacle.

7. The fastener of claim 5 wherein the locking mechanism is disposed within an axial slot between an outer surface of the insert and an inner surface of the receptacle.

8. The fastener of claim 5 wherein the locking mechanism is an adhesive on the interfacing threaded surfaces of the insert and receptacle.

9. The fastener of claim 1 wherein the cylindrical body has a circumferential lip extending radially toward the shaft, and the lip engages the bottom end of the spring when the fastener is in the locked position.

10. The fastener of claim 9 further comprising a retaining ring disposed on the cylindrical body of the grommet on the side of the first panel facing the second panel.

11. A fastener for securing a first panel to a second panel, wherein the first panel and the second panel each include an aperture and the apertures are aligned for receiving the fastener, the fastener comprising:
a grommet having a cylindrical body configured to be inserted through the aperture of the first panel, and a flange connected to the cylindrical body to engage an outer surface of the panel facing away from the second panel;
a stud including a shaft, a head at a first end of the shaft and distal to a second end of the shaft, wherein the shaft and second end of the shaft are insertable through the cylindrical body of the grommet and through the apertures in the first and second panels;
a handle that is pivotally connected to the head of the stud;
a spring disposed along the shaft between the head of the stud and the second end of the shaft;
a grommet having a flange portion and cylindrical body connected to the flange and wherein the cylindrical body of the grommet surrounds at least a portion of the spring and at least a portion of the shaft;
a spacer between the handle and spring, and the spacer is in contact with the handle and spring; and,
wherein the spring has a top end in contact with the spacer and a bottom end in contact with a surface of the cylindrical body of the grommet to bias the spacer against the handle.

12. The fastener of claim 11 further comprising a retainer ring on the shaft between the head of the stud and the second end of the shaft.

13. The fastener of claim 12 wherein the retainer ring is circumferential ridge integrally connected with the shaft of the stud.

14. The fastener of claim 11 further comprising:
a receptacle mounted to a second side of the second panel facing away from the first panel and at the aperture of the second panel, and the receptacle includes an internally threaded surface; and,
an insert configured for threaded engagement with the receptacle, and the insert having cam and locking surfaces to be engaged by a cross pin on the shaft.

15. The fastener of claim 14 wherein in the receptacle is a rivet nut.

16. The fastener of claim 11 wherein the retainer ring is a circumferential ridge integrally formed on the shaft of the stud.

* * * * *